United States Patent
Kim et al.

(10) Patent No.: US 8,898,580 B2
(45) Date of Patent: *Nov. 25, 2014

(54) DEFINITION FOR SERVICE INTERFACE

(75) Inventors: Jane T Kim, Seattle, WA (US); Sean Lyndersay, Mountain View, CA (US); Miladin Pavlicic, Sammamish, WA (US); Dave Risney, Redmond, WA (US); Todd Sahl, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/618,901

(22) Filed: Sep. 14, 2012

(65) Prior Publication Data

US 2013/0014038 A1   Jan. 10, 2013

Related U.S. Application Data

(63) Continuation of application No. 12/042,332, filed on Mar. 5, 2008, now Pat. No. 8,302,017.

(51) Int. Cl.
*G06F 3/00* (2006.01)
*H04L 29/06* (2006.01)

(52) U.S. Cl.
CPC ..................................... *H04L 69/06* (2013.01)
USPC .......................................... 715/762; 707/804

(58) Field of Classification Search
None
See application file for complete search history.

(56) References Cited

U.S. PATENT DOCUMENTS

| | | | |
|---|---|---|---|
| 5,323,452 A | 6/1994 | Dickman et al. | |
| 6,100,885 A * | 8/2000 | Donnelly et al. | 715/762 |
| 6,792,605 B1 * | 9/2004 | Roberts et al. | 719/313 |
| 6,981,263 B1 | 12/2005 | Zhang et al. | |
| 7,478,397 B1 | 1/2009 | Borries et al. | |
| 7,738,900 B1 | 6/2010 | Manroa et al. | |
| 8,302,017 B2 | 10/2012 | Kim | |
| 2002/0029256 A1 | 3/2002 | Zintel et al. | |
| 2002/0035556 A1 | 3/2002 | Shah et al. | |
| 2003/0105884 A1 * | 6/2003 | Upton | 709/318 |
| 2004/0006649 A1 | 1/2004 | Cirne | |
| 2004/0017392 A1 | 1/2004 | Welch | |
| 2004/0030616 A1 * | 2/2004 | Florance et al. | 705/27 |

(Continued)

FOREIGN PATENT DOCUMENTS

TW   200622895   7/2006

OTHER PUBLICATIONS

Web Service Modeling Ontology, Roman et al., Applied Ontology 1, pp. 77-106, 2005.*

(Continued)

*Primary Examiner* — Augustine K Obisesan
(74) *Attorney, Agent, or Firm* — Andrew Sanders; Micky Minhas

(57) ABSTRACT

Various embodiments provide a model through which service providers can describe offered services using a standardized format. In one or more embodiments, the standardized format is declarative and enables service providers to describe their associated services in a standardized way. In at least some embodiments, the standardized format includes a set of common service properties that are shared across multiple different services. Additionally, service specific properties can be described in addition to the common service properties. In one or more embodiments, existing services can be extended by including, in the standardized format, a description of an extension. In one or more other embodiments, new services can be added for consumption by simply including a description of the new service using the standardized format.

19 Claims, 3 Drawing Sheets

(56) References Cited

U.S. PATENT DOCUMENTS

| | | | |
|---|---|---|---|
| 2004/0054690 A1* | 3/2004 | Hillerbrand et al. | 707/104.1 |
| 2004/0068554 A1 | 4/2004 | Bales et al. | |
| 2004/0133580 A1 | 7/2004 | Liu et al. | |
| 2004/0177335 A1 | 9/2004 | Beisiegel et al. | |
| 2004/0181596 A1 | 9/2004 | Sabiers et al. | |
| 2004/0242186 A1 | 12/2004 | Thanh et al. | |
| 2005/0066284 A1 | 3/2005 | Ho et al. | |
| 2005/0091575 A1* | 4/2005 | Relyea et al. | 715/502 |
| 2005/0091670 A1* | 4/2005 | Karatal et al. | 719/328 |
| 2005/0091672 A1* | 4/2005 | Debique et al. | 719/328 |
| 2005/0192984 A1* | 9/2005 | Shenfield et al. | 707/100 |
| 2005/0256882 A1* | 11/2005 | Able et al. | 707/10 |
| 2005/0266879 A1 | 12/2005 | Spaur | |
| 2005/0273839 A1 | 12/2005 | Mikkonen et al. | |
| 2005/0278348 A1* | 12/2005 | Falter et al. | 707/100 |
| 2005/0278727 A1 | 12/2005 | Mogilevsky et al. | |
| 2006/0005138 A1 | 1/2006 | Rohwedder et al. | |
| 2006/0020585 A1* | 1/2006 | Harvey et al. | 707/3 |
| 2006/0056334 A1 | 3/2006 | Yuan et al. | |
| 2006/0069774 A1* | 3/2006 | Chen et al. | 709/225 |
| 2006/0074737 A1* | 4/2006 | Shukla et al. | 705/8 |
| 2006/0136251 A1 | 6/2006 | Sung | |
| 2006/0206559 A1 | 9/2006 | Xie | |
| 2006/0230145 A1 | 10/2006 | Zarakhovsky | |
| 2006/0236306 A1* | 10/2006 | DeBruin et al. | 717/113 |
| 2006/0242129 A1 | 10/2006 | Libes | |
| 2006/0294526 A1 | 12/2006 | Hambrick et al. | |
| 2007/0002689 A1* | 1/2007 | Mateescu et al. | 367/73 |
| 2007/0011605 A1 | 1/2007 | Dumitru et al. | |
| 2007/0016697 A1 | 1/2007 | Roh | |
| 2007/0022384 A1 | 1/2007 | Abbott et al. | |
| 2007/0038937 A1 | 2/2007 | Asakawa et al. | |
| 2007/0073769 A1 | 3/2007 | Baikov et al. | |
| 2007/0073771 A1* | 3/2007 | Baikov et al. | 707/104.1 |
| 2007/0073849 A1 | 3/2007 | Baikov et al. | |
| 2007/0078988 A1* | 4/2007 | Miloushev et al. | 709/227 |
| 2007/0113238 A1 | 5/2007 | Smirnov | |
| 2007/0150480 A1 | 6/2007 | Hwang et al. | |
| 2007/0174143 A1 | 7/2007 | Smilowitz et al. | |
| 2007/0192715 A1 | 8/2007 | Kataria et al. | |
| 2007/0198451 A1 | 8/2007 | Kehlenbeck | |
| 2007/0208605 A1 | 9/2007 | Ambrose et al. | |
| 2007/0209041 A1 | 9/2007 | Exley | |
| 2007/0220035 A1* | 9/2007 | Misovski | 707/102 |
| 2007/0233646 A1 | 10/2007 | Sauve | |
| 2007/0250408 A1 | 10/2007 | Leon et al. | |
| 2007/0255717 A1* | 11/2007 | Baikov et al. | 707/10 |
| 2008/0091729 A1 | 4/2008 | Iba | |
| 2008/0184157 A1* | 7/2008 | Selig | 715/781 |
| 2008/0228781 A1* | 9/2008 | Chen et al. | 707/10 |
| 2008/0229228 A1* | 9/2008 | Cohen | 715/772 |
| 2009/0228469 A1 | 9/2009 | Kim et al. | |

OTHER PUBLICATIONS

DAML-S: Web Service Description for the Semantic Web, Ankolekar et al, ISWC, LNCS 2342, pp. 348-363, 2002.*

"Final Office Action", U.S. Appl. No. 12/042,332, (Feb. 16, 2011), 16 pages.

"Final Office Action", U.S. Appl. No. 12/042,332, (Aug. 23, 2011), 18 pages.

"Final Office Action", U.S. Appl. No. 12/042,332, (Sep. 15, 2010), 17 pages.

"Non-Final Office Action", U.S. Appl. No. 12/042,332, (Nov. 15, 2010), 17 pages.

"Non-Final Office Action", U.S. Appl. No. 12/042,332, (May 13, 2011), 18 pages.

"Non-Final Office Action", U.S. Appl. No. 12/042,332, (Jun. 18, 2010), 14 pages.

"Notice of Allowance", U.S. Appl. No. 12/042,332, (Jul. 25, 2012), 7 pages.

"Open Search", Retrieved from http://a9.com/-/company/opensearch.jsp on Nov. 19, 2007, 1 Page.

"Open Service Interface Definition Repository", Retrieved from http://plectrudis.mit.edu/okicommunity/filemgmt_data/files/OSID_Repository_rel_2_0.pdf., (Oct. 15, 2004), 11 Pages.

"PCT Search Report and Written Opinion", Application No. PCT/US2009/034103, (Aug. 18, 2009), 12 pages.

Ensel, Christian et al., "An Approach for Managing Service Dependencies with XML and the Resource Description Framework", *Journal of Network and Systems Management*, vol. 10, No. 2, (Jun. 2002), pp. 147-170.

Foster, Ian et al., "Grid Services for Distributed System Integration", *IEEE*, (Jun. 2002), 10 pages.

Hermann, Reto et al., "DEAPspace—Transient ad hoc networking of pervasive devices", *IBM Research Division, Zurich Research Laboratory, Ruschlikon, Switzerland*, (2001), 18 pages.

Medina, Enrique et al., "A Standard for Representing Multidimensional Properties: The Common Warehouse Metamodel (CWM)", *Departamento de Lenguajes y Sistemas Informaticos, Universidad de Alicante, Spain*, (2002), 16 pages.

Merz, M. et al., "Service Trading and Mediation in Distributed Computing Systems", *In Proceedings of the International Conference on Distributed Computing Systems* (Jun. 1994), pp. 450-457.

O'Sullivan, Justin et al., "Formal Description of Non-Functional Service Properties", *Business Process Management Group, Centre for Information Technology Innovation, Queensland University of Technology*, (Feb. 9, 2005), 33 pages.

Thompson, J. Patrick "Web-Based Enterprise Management Architecture", *IEEE Communications Magazine*, (Mar. 1998), 7 pages.

Zhao, Weibin et al., "Enhancing Service Location Protocol for efficiency, scalability and advanced discovery", *The Journal of Systems and Software* vol. 75 (2005), pp. 193-204.

Zhao, Weibin et al., "Improving SLP Efficiency and Extendability by Using Global Attributes and Preference Filters", *International Conference on Computer Communications and Networks* (ICCCN'02), Miami, Florida (Oct. 2002), 4 pages.

"Foreign Office Action", TW Application No. 98102542, Feb. 24, 2014, 15 Pages.

* cited by examiner

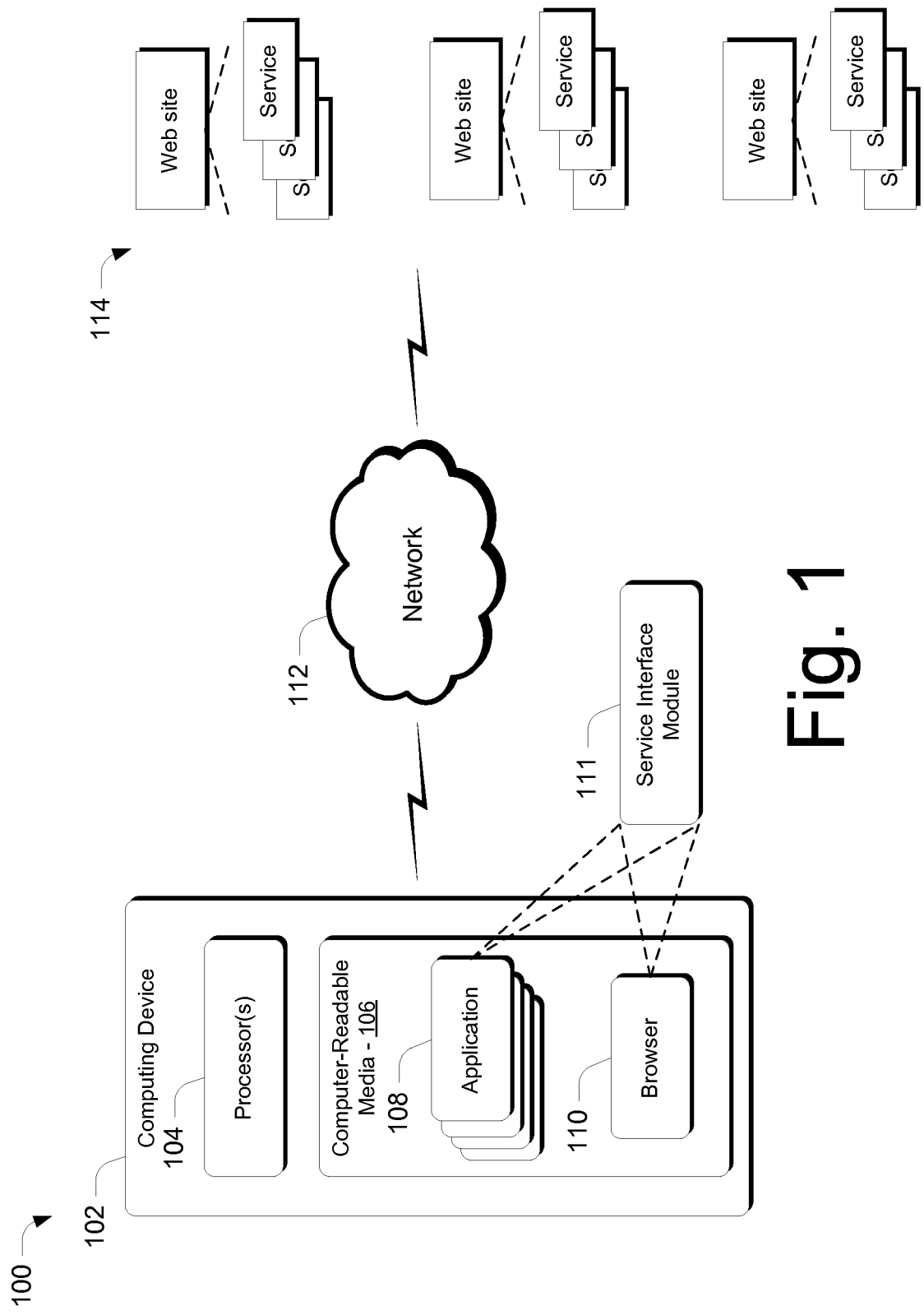

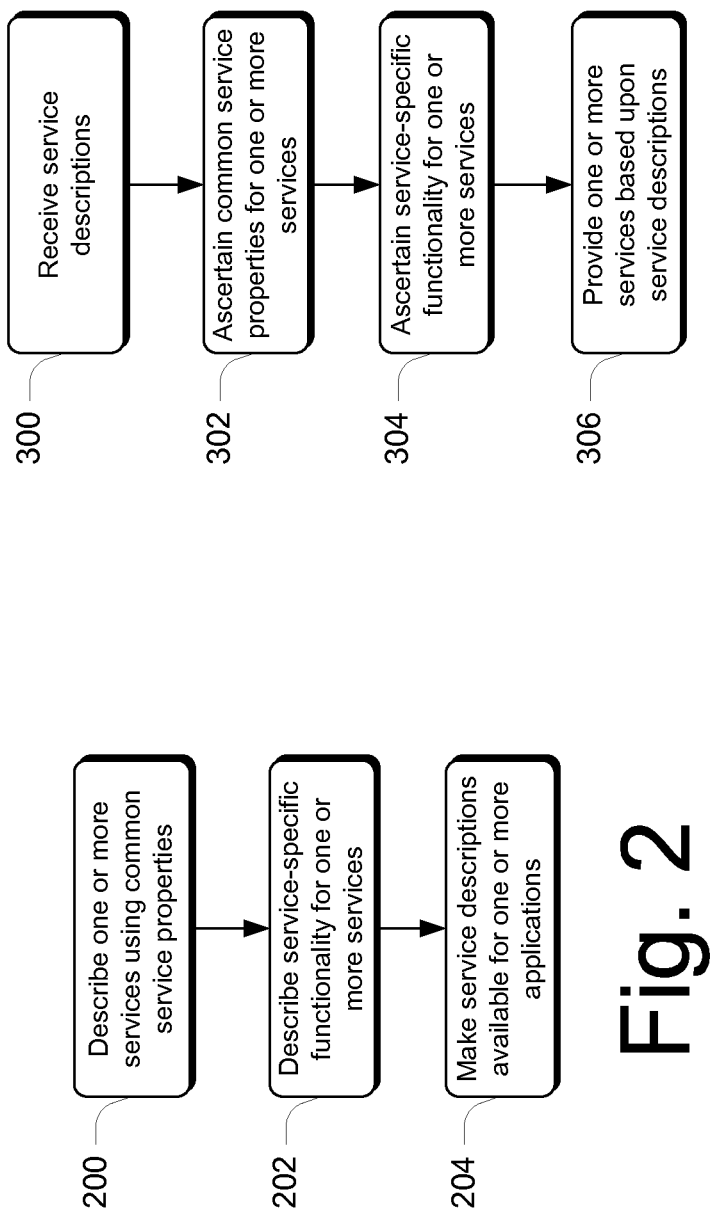

DEFINITION FOR SERVICE INTERFACE

RELATED APPLICATION

This application is a continuation of, and claims priority to, U.S. patent application Ser. No. 12/042,332, filed on Mar. 5, 2008, the disclosure of which is incorporated by reference herein.

BACKGROUND

Today, in order for a service, such as a web service, to integrate with client side applications, many solutions use loose integration "hooks" to enable the service to plug into the application experience. As those in the industry will attest, few truly successful examples of loose integration exist. This is due in large part to the difficulty of delivering a rich user experience when services differ in capacity and, to the related problem of attempting to clearly define an interface between the client and the service in a way that can be easily understood and implemented.

SUMMARY

Various embodiments provide a model through which service providers can describe offered services using a standardized format. In one or more embodiments, the standardized format is declarative and enables service providers to describe their associated services in a standardized way. In at least some embodiments, the standardized format includes a set of common service properties that are shared across multiple different services. Additionally, service-specific properties can be described in addition to the common service properties.

In one or more embodiments, existing services can be extended by including, in the standardized format, a description of an extension. In one or more other embodiments, new services can be added for consumption by simply including a description of the new service using the standardized format.

In at least some embodiments, the standardized format is represented through a declarative, hierarchical tag-based language.

BRIEF DESCRIPTION OF THE DRAWINGS

FIG. 1 illustrates a system in which the inventive principles can be employed in accordance with one or more embodiments.

FIG. 2 is a flow diagram that describes steps in a method in accordance with one or more embodiments.

FIG. 3 is a flow diagram that describes steps in a method in accordance with one or more embodiments.

DETAILED DESCRIPTION

Overview

Figure 4:
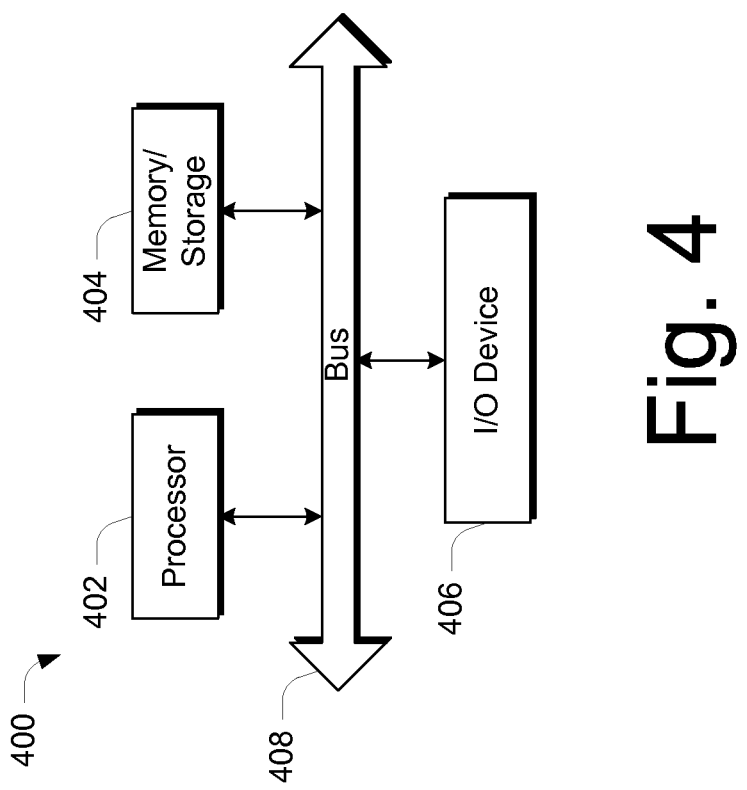
FIG. 4 is a block diagram of a system that can be utilized to implement one or more embodiments.

Various embodiments provide a model through which service providers can describe offered services using a standardized format. In one or more embodiments, the standardized format is declarative and enables service providers to describe their associated services in a standardized way. In at least some embodiments, the standardized format includes a set of common service properties that are shared across multiple different services. Additionally, service specific properties can be described in addition to the common service properties. In one or more embodiments, existing services can be extended by including, in the standardized format, a description of an extension. In one or more other embodiments, new services can be added for consumption by simply including a description of the new service using the standardized format.

In at least some embodiments, the standardized format is represented through a declarative, hierarchical tag-based language. By way of example and not limitation, a suitable hierarchical text-based language is XML. It is to be appreciated and understood, however, that other methods and ways of representing the standardized format can be utilized without departing from the spirit and scope of the claimed subject matter.

In the discussion that follows, a section entitled "Operating Environment" describes an operating environment that can be utilized to practice the inventive principles described herein in accordance with one or more embodiments. Following this, a section entitled "Example Standardized Format" is provided and describes but one example of a standardized format in accordance with one or more embodiments. Following this, a section entitled "Common Service Properties—Example" describes some examples of common service properties in accordance with one or more embodiments. Next, a section entitled "Extending an Existing Service" is provided and describes an embodiment in which an existing service can be extended. Following this, a section entitled "Adding a New Service" describes how a new service can be added in accordance with one or more embodiments. Next, a section entitled "Example Methods" is provided and describes methods in accordance with one or more embodiments. Last, a section entitled "Example System" is provided and describes but one system that can be utilized in accordance with one or more embodiments.

Operating Environment

FIG. 1 illustrates an operating environment in accordance with one or more embodiments, generally at 100. Environment 100 includes a computing device 102 having one or more processors 104, one or more computer-readable media 106 and one or more applications 108 that reside on the computer-readable media and which are executable by the processor(s). Applications 108 can include any suitable type of application such as, by way of example and not limitation, reader applications, e-mail applications, instant messaging applications, and a variety of other applications. In addition, a Web browser 110 is provided and includes a service interface module 111 that is configured to operate as described above and below. Specifically, the service interface module 111 is configured to operate using a model that provides standardized format through which various types of services can be described. Service descriptions using the standardized format can describe not only a common set of properties shared among various services, but also service-specific properties that describe nuances associated with how a service is to be consumed, as will become apparent below.

It is to be appreciated and understood that while service interface module 111 is shown as comprising part of Web browser 110, the service interface module can manifest itself as a stand-alone component that is used by the Web browser. In addition, the service interface can be used by other applications, services, and entities including, by way of example and not limitation, other service providers and Web-based applications.

The computer-readable media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 4.

In addition, environment 100 includes a network 112, such as the Internet, and one or more web sites 114 from and to which content can be received and sent. Websites 114 can offer a variety of services that can be consumed by applications 108 and Web browser 110, as will become apparent below. In addition, in at least some embodiments, services can be offered locally on a client computing device.

Computing device 102 can be embodied as any suitable computing device such as, by way of example and not limitation, a desktop computer, a portable computer, a handheld computer such as a personal digital assistant (PDA), cell phone, and the like.

Example Standardized Format

The discussion below describes an example standardized format that can be used to describe various different types of services. It is to be appreciated and understood that the description below constitutes an example only and is not to be used to limit application of the claimed subject matter to the specific example format described.

In the model described below, service providers can describe offered services using a standardized format which, in this particular example, employs XML. The standardized format is declarative in the sense that it defines or otherwise declares properties associated with various services that are offered by service providers. In addition, in at least some embodiments, consumers of the standardized format, such as applications and other entities, can select portions of the format to support. For example, some applications may support the full format while other applications might support a subset of the format. In the discussion that follows, a set of common service properties are first described. In at least some embodiments, the set of common service properties are shared across multiple different services. Following this, a discussion of service-specific properties is provided. The service-specific properties are used to describe specific attributes or properties associated with a particular service. These service-specific properties can be used to describe a service being offered, a service that has been extended, and/or a new service.

Common Service Properties—Example

In one or more embodiments, the standardized format describes a common set of service properties that are employed by one or more services. In at least some embodiments, many of the services that can be consumed an application, such as a Web browser, use the standardized format to describe the common set of service properties.

In one or more embodiments, the common set of service properties includes, by way of example and not limitation, a property associated with a homepage URL of the service and a display, such as a visually-renderable display, associated with the service. As but one example of how these common service properties can be represented using the standardized format, consider the following:

```
<OpenServiceDescription>
    <homepageUrl />
    <display />
</OpenServiceDescription>
```

In one or more embodiments, the common set of service properties represents a set of properties that services embody. By way of example and not limitation, these properties can include: a name property, an icon property, and a description property. Service-specific functionality is described within its own node in the standardized format. Using the standardized format can allow applications to reliably support service functionality and enable a consistent user experience. As an embellishment of the XML representation shown above, consider the following:

```
<?xml version="1.0" encoding="UTF-8"?>
<openServiceDescription
    xmlns="http://www.microsoft.com/schemas/openservicedescription/
    1.0">
<homepageUrl>http://encarta.msn.com </homepageUrl>
    <display>
        <name>Define with Encarta</name>
        <icon>http://encarta.msn.com/favicon.ico </icon>
        <description>Encarta provides up-to-date encyclopedia,
    dictionary, and atlas </description>
    </display>
```

The first thing to notice about the representation above is that, in one or more embodiments, a specific namespace is defined for the described services. This is useful, as will be appreciated by the skilled artisan, because it helps to fully qualify a service and, accordingly, avoid collisions with other similarly-named services which are not qualified by the same namespace.

Further, in this example, a <homepageUrl> tag describes a homepage associated with the particular service. In this particular example, the homepage URL is "encarta.msn.com". In one or more embodiments, a service has an ID which, in this example, is a combination of the homepageURL and the type of service. Other service IDs can, of course, be used. Additionally, the <display> tag describes three properties associated with the particular service. In this particular example, these properties include, by way of example and not limitation, a name, an icon, and a description. Notice that the icon property contains a link to an icon associated with the service.

Having now discussed an example of a common set of service properties that are shared across multiple different services, consider now a discussion of two specific types of services which serve as an illustration of how a particular service can be represented using the standardized format. It is to be appreciated and understood that these specific services are provided as an example and are not intended to limit application of the claimed subject matter to these particular services. Rather, other services can be described using the standardized format without departing from the spirit and scope of the claimed subject matter.

In the example that follows, services in the form of an activity service and an e-mail service are described.

With regard to an activity service, such can be considered as a specific type of service that is used to send content to a webpage. The description of the activity service uses the standardized format and describes the type of content a service can handle, what to display on a preview of a selected service, and where to navigate the user on execution of a particular activity. As an example of a representation of an activity service using the standardized format, consider the following:

```
<?xml version="1.0" encoding="UTF-8"?>
<openServiceDescription
    xmlns="http://www.microsoft.com/schemas/
    openservicedescription/1.0">
    <homepageUrl>http://maps.yahoo.com </homepageUrl>
    <display>
        <name>Map with Yahoo!</name>
        <icon>http://www.yahoo.com/favicon.ico </icon>
```

```
        </display>
        <activity category="map">
            <activityAction context="selection" >
                <preview action =
"http://api.maps.yahoo.com/livewords/livewords.php?entity=
{selection}"/>
                <execute
                    method="get"
                    action="http://maps.yahoo.com/">
                    <parameter name="csz" value="{selection}"
                    type="text" />
                </execute>
            </activityAction>
        </activity>
</openServiceDescription>
```

In the illustrated and described embodiment, the standardized format can be utilized to describe the category of a particular activity service. For example, in the representation above, an <activity> tag includes a category property. In this particular example, the category property describes a "map" which defines this activity service as a mapping service. Other types of categories can, however, be used. These types of other categories include, by way of example and not limitation, e-mail activities, define activities, translate activities, and the like.

The nature of an activity service definition is such that it can define different actions that a user can take and what actions to perform responsive to a user action. In the illustrated and described embodiment, the <activityAction> tag is used to describe what happens when the user makes a selection or when the user right clicks on a link. In this particular example, when the user makes a selection, the user invokes an activity such as a mapping activity. So, for example, when the user selects an address on a webpage, the selection can be used to implement a preview action. To implement a preview action, the user's selection is provided into the URL listed under the <preview> tag. This URL is sent to an associated service provider that then processes the user's selection and returns an associated visual preview for the user to see. If, after seeing the preview, the user wishes to have the full mapping function executed, they can simply click on the displayed preview to invoke the functionality described in the <execute> tag. Additionally, services can obtain properties of a document and a user's selection as variables. These variables can be expressed as part of the action URL or through form-based parameters. In accordance with one or more embodiments, the following variables can be supported:

documentUrl
documentTitle
documentDomain
selection
link
linkTitle
linkRel
linkType
linkDomain In the above example, variables are enclosure in brackets { }. A variable can be specified as optional by using a "?" after the variable name. If the value of an optional variable is empty, an empty text string in used.

Inline parameters can be used to specify inputs to a service through a URI template. As an example, consider the following:

```
<execute method="get"
action="http://foo.com/done.aspx?url={documentUrl}&title=
{documentTitle?}" />
```

In this example, documentUrl is a required variable and documentTitle is an optional variable. If the value of documentTitle is empty, then an empty string is used. If the value of documentUrl is empty, then the Activity errors.

Form-based parameters can be used to specify inputs to a service through name-value pairs, similar to HTTP form submissions. This is useful for making HTTP post requests or if the HTTP get request could be longer than the URL character limit.

The parameter element is used to list name-value pairs. This uses the same example as the inline parameters above:

```
<execute method="post" action="http://foo.com/done.aspx>
    <parameter name="url" value="{documentUrl}" />
    <parameter name="title" value="{documentTitle?}" />
</execute>
```

Here, if the variable is indicated as optional and the value is empty, then the value of the optional variable is an empty string. If the variable is required and the value of the variable is empty then the entire name-value pair is not used as part of the form submission.

In one or more embodiments, one can also use the action URL and parameters as a way to track the usage of a service. This can be done by adding a special parameter with a special value indicating that it is from a browser, such as Internet Explorer 8. As an example, consider the following:

```
<execute method="post" action="http://foo.com/done.aspx>
    <parameter name="url" value="{documentUrl}" />
    <parameter name="source" value="IE8" />
</execute>
```

Returning to the example above, the functionality described in the <execute> tag describes an HTTP "get" method which uses the associated URL described by the "action" property in conjunction with the data provided by the <parameter> tag. In operation, the user can be navigated to the listed URL and have their particular selection mapped by the webpage associated with the URL.

With respect to an e-mail service, such can be considered as a specific type of service that describes the functionality of web-based e-mail. In operation, the standardized format can be used to describe an URL to an inbox, an URL to get updates to the inbox, and how to send content to a new compose message.

As of example representation of an e-mail service using the standardized format, consider the following:

```
<?xml version="1.0" encoding="UTF-8"?>
<openServiceDescription
    xmlns="http://www.microsoft.com/schemas/
    openservicedescription/1.0">
    <homepageUrl>http://hotmail.live.com </homepageUrl>
    <display>
        <name>Hotmail</name>
    </display>
    <email>
        <compose action="http://www.hotmail.com/secure/start">
            <parameter name="subject" value="{subject?}"
            type="text" />
```

```
            <parameter name="body" value="{body?}
            type="html" />
        </compose>
        <composePreview action="http://www.hotmail.com/
        Recipients.htm" />
        <inbox
            open="http:// mail.live.com/mail/"
            monitor="http://mail.live.com/feed.xml" >
        </inbox>
    </email>
</openServiceDescription>
```

In the above example, after the description of the common service properties, a separate <email> tag is provided. The <compose> tag contains a description of information associated with composing a message. The illustrated URL describes where information is sent when the user composes an e-mail message. The various parameters within this tag pertain to information that is to be included in the message. Specifically, there is a subject field and a body field.

In addition, a user can also receive a preview by virtue of the preview URL that is described in the <composePreview> tag. When this is invoked, a webpage referenced by the URL is fetched and surfaced for the user.

The final part of the XML representation above describes an inbox representation. This representation describes information associated with allowing a user to check their inbox to ascertain if there are any updates. In operation, the browser can create a button in the chrome of the user interface which allows the user to check their e-mail. In the illustrated and described embodiment, the XML representation describes an URL associated with the e-mail updates. In this particular example, the <monitor> tag describes a feed to which a browser can subscribe to receive e-mail updates.

Having discussed some example services, consider now a discussion of how an existing service can be extended and how a new service can be added in accordance with one or more embodiments.

Extending an Existing Service

In one or more embodiments, the standardized format provides a mechanism by which existing services can be extended. To extend an existing service, one simply includes a description of that service extension using the standardized format. In at least some embodiments, an existing service can be extended by defining a new namespace for the service extension, and then describing the extension parameters relative to the newly-defined namespace. As an example, consider the following XML representation. In this example, an existing activity service is extended with thesaurus functionality.

```
<?xml version="1.0" encoding="UTF-8"?>
<openServiceDescription
    xmlns="http://www.microsoft.com/schemas/
    openservicedescription/1.0"
    xmlns:word="http://word.service.org/schemas/wordservice/1.0" >
    <homepageUrl>http://encarta.msn.com </homepageUrl>
    <display>
        <name>Define with Encarta</name>
        <icon>http://encarta.msn.com/favicon.ico</icon>
    </display>
    <activity type="define">
        <activityAction context="selection" >
            <execute
            action="http://encarta.msn.com/dictionary_/{selection}.html"/>
                <word:getThesaursus
                    url=" http://thesaurus.reference.com/{selection}.html"/>
            </activityAction>
        </activity>
</openServiceDescription>
```

Notice in this example, a new namespace definition is provided near the top of the XML representation, i.e. the second occurrence of the "xmlns" string. Further in the XML representation, the thesaurus functionality is described in the <activityAction> tag.

In this manner, existing services can be extended by describing the extensions using the standardized format. Alternately or additionally, new services can be added as described just below.

Adding a New Service

In one or more embodiments, a new service can be added by creating a new node as a child of the root node in the standardized format. In the example just below, a new service is created by creating a namespace, i.e. the second occurrence of the "xmlns" and then describing the new service as indicated. In this particular example, the service is described as a link service which allows a user to synchronize their bookmarks with a client machine.

In the XML representation shown just below, notice that the common set of service properties is provided and everything after that in the representation pertains to the new service, i.e. the <link> tag.

```
<?xml version="1.0" encoding="UTF-8"?>
    <openServiceDescription
        xmlns="http://www.microsoft.com/schemas/
        openservicedescription/1.0"
        xmlns:ext="http://link.service.org/schemas/linkservice/1.0" >
    <homepageUrl>http://del.icio.us </homepageUrl>
    <display>
        <name>Add to Del.icio.us</name>
        <icon>http://http://del.icio.us/favicon.ico </icon>
        <description>Access your bookmarks from any computer!
Sync bookmarks with your computer</description>
    </display>
    <ext:link>
        <ext:tags>
            <ext:retrieve url="https://api.del.icio.us/v1/tags/get"/>
            <ext:rename url="https://api.del.icio.us/v1/tags/rename?"/>
        </ext:tags>
        <ext:retrieveBookmarks>
            <ext:retrieve                                type="all"
url="https://api.del.icio.us/v1/posts/all?">
                <ext:argument name="tag?"/>
            </ext:retrieve>
        </ext:retreiveBookmarks>
        <ext:editBookmarks>
            <ext:add url="https://api.del.icio.us/v1/posts/add?">
                <ext:argument name="url"/>
                <ext:argument name="description"/>
                <ext:argument name="tags?"/>
            </ext:add>
            <ext:delete
    url="https://api.del.icio.us/v1/posts/delete?{url}"/>
        </ext:editBookmarks>
    </ext:link>
</openServiceDescription>
```

Example Methods

FIGS. 2 and 3 are flow diagrams that describe steps in a method in accordance with one or more embodiments. The methods can be performed in connection with any suitable hardware, software, firmware, or combination thereof. In at least some embodiments, aspects of the methods can be implemented in connection with a Web browser. In the discussion that follows, the method described in FIG. 2 pertains to a method of describing services; and, the method described in FIG. 3 pertains to a method of discovering and providing services.

Referring to FIG. 2, step 200 describes one or more services using common service properties. This step can be performed in any suitable way. For example, a service provider can provide a description of one or more of their services using a standardized format. An example of common service properties as well as a standardized format is provided above. Step 202 describes service-specific functionality for one or more services. The step can be performed in any suitable way. For example, a service provider can provide service-specific functionality descriptions for one or more services that they offer. Examples of how this can be done are provided above. Step 204 makes service descriptions available for one or more applications. The step can be performed in any suitable way. For example, once the service descriptions are built, the service descriptions can be provided into one or more files that can be downloaded to a client device. So, for example, when the user wishes to subscribe to a particular service, they may click a particular user interface instrumentality to indicate that they wish to consume a service. Responsive to indicating an interest in a service, a service description such as that described above can be sent to the user's client device. Now, the user's application has a declarative definition of the service and can take steps, such as those described above, to implement the service's functionality. It is to be appreciated and understood that in at least some embodiments, receiving a service description such as those described above, and executing associated functionality can be performed independent of, and without downloading associated executable code.

Referring to FIG. 3, step 300 receives one or more service descriptions. Service descriptions can be received in any suitable way. For example, a file that contains one or more service descriptions can be received. Examples of service descriptions are provided above. This step can be performed by any suitable application or other entity, examples of which include a Web browser. Step 302 ascertains, from the service descriptions, common service properties for one or more services. Examples of common service properties are provided above. Step 304 ascertains, from the service descriptions, service-specific functionality for one or more services. Examples of how this can be done are provided above. Step 306 provides one or more services based upon the service descriptions.

In the illustrated and described embodiments, provision of services based upon the service descriptions can be provided by ascertaining user actions described in the service descriptions, and then responsively taking an action, also described in the service descriptions, based upon the user's action.

Having described various embodiments above, consider now an example system that can be utilized to implement one or more of the embodiments.

Example System

FIG. 4 illustrates an example computing device 400 that can implement the embodiments described above. Computing device 400 can be, for example, computing device 102 of FIG. 1 or any other suitable computing device.

Computing device 400 includes one or more processors or processing units 402, one or more memory and/or storage components 404, one or more input/output (I/O) devices 406, and a bus 408 that allows the various components and devices to communicate with one another. Bus 408 represents one or more of any of several types of bus structures, including a memory bus or memory controller, a peripheral bus, an accelerated graphics port, and a processor or local bus using any of a variety of bus architectures. Bus 408 can include wired and/or wireless buses.

Memory/storage component 404 represents one or more computer storage media. Component 404 can include volatile media (such as random access memory (RAM)) and/or non-volatile media (such as read only memory (ROM), Flash memory, optical disks, magnetic disks, and so forth). Component 404 can include fixed media (e.g., RAM, ROM, a fixed hard drive, etc.) as well as removable media (e.g., a Flash memory drive, a removable hard drive, an optical disk, and so forth).

One or more input/output devices 406 allow a user to enter commands and information to computing device 400, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and.

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Various embodiments provide a model through which service providers can describe offered services using a standardized format. In one or more embodiments, the standardized format is declarative and enables service providers to describe their associated services in a standardized way. In at least some embodiments, the standardized format includes a set of common service properties that are shared across multiple different services. Additionally, service specific properties can be described in addition to the common service properties. In one or more embodiments, existing services can be extended by including, in the standardized format, a description of an extension. In one or more other embodiments, new services can be added for consumption by simply including a description of the new service using the standardized format.

In at least some embodiments, the standardized format is represented through a declarative, hierarchical tag-based language. By way of example and not limitation, a suitable hierarchical text-based language is XML. It is to be appreciated and understood, however, that other methods and ways of representing the standardized format can be utilized without departing from the spirit and scope of the claimed subject matter.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. One or more computer readable storage media hardware embodying computer-readable instructions that, responsive to execution by at least one processor, implement a method comprising:
   describing, within a first node using a standardized format, common web service properties associated with a web service, the common web service properties being properties shared among multiple different web services, wherein the common web service properties include:
      a property associated with a homepage uniform resource locator (URL); and
      a property associated with a visually-renderable display that is expressed via a display tag, the property associated with the visually-renderable display comprising an icon property containing a link to an icon;
   describing, within at least a second node using the standardized format, specific functionality associated with the web service, the specific functionality including:
      at least one activity category configured to describe a type of service associated with the web service;
      at least one action definition associated with the web service, each action definition configured to describe an action a user can take associated with the web service, including a preview action causing display of a preview of an associated function, the associated function configured to execute responsive to a user selecting the display of the preview; and
      at least one input parameter to the web service; and
   making said first and at least second node web service descriptions available for one or more client-side applications.

2. The one or more computer readable storage media hardware of claim 1, wherein the standardized format comprises Extensible Markup Language (XML).

3. The one or more computer readable storage media hardware of claim 1, wherein the act of making is performed by making the web service descriptions available for a Web browser.

4. The one or more computer readable storage media hardware of claim 1, wherein the property associated with the visually-renderable display for a web service further comprises properties associated with a name and a description.

5. The one or more computer readable storage media hardware of claim 1, wherein the standardized format uses at least one namespace to describe said one or more web services.

6. The one or more computer readable storage media hardware of claim 1, wherein said standardized format is used to extend an existing web service.

7. The one or more computer readable storage media hardware of claim 1, wherein said standardized format is used to add a new web service.

8. One or more computer readable storage media hardware embodying computer-readable instructions that, responsive to execution by at least one processor, implement a method comprising:
   receiving one or more web service descriptions, the web service descriptions being represented in a standardized format, at least one of the one or more web service descriptions pertaining to an e-mail service;
   ascertaining, from the web service descriptions, common web service properties for one or more web services, wherein the common web service properties include a property associated with a homepage uniform resource locator (URL) and a property associated with a visually-renderable display for a web service that is expressed via a display tag, the property associated with the visually-renderable display for a web service comprising an icon property associated with a displayable icon;
   ascertaining, from the web service descriptions, web service-specific functionality for the e-mail service, the ascertaining including an ability to ascertain one or more optional parameters, associated with the e-mail service, within the web service descriptions; and
   providing the e-mail service based upon the web service descriptions.

9. The one or more computer readable storage media hardware of claim 8, wherein the standardized format comprises Extensible Markup Language (XML).

10. The one or more computer readable storage media hardware of claim 8, wherein the standardized format uses at least one namespace to describe said one or more web services.

11. The one or more computer readable storage media hardware of claim 8, wherein said receiving one or more web service descriptions, ascertaining common web service properties, ascertaining web service-specific functionality for the e-mail service, and providing the e-mail service are performed by a Web browser.

12. The one or more computer readable storage media hardware of claim 8, wherein the homepage URL is used to identify a web service.

13. The one or more computer readable storage media hardware of claim 8, wherein the property associated with the visually-renderable display for a web service further comprises properties associated with a name and a description.

14. The one or more computer readable storage media hardware of claim 8, the method further comprising supporting only a portion of the standardized format.

15. One or more computer-readable storage media hardware having embodied thereon:
   at least one file configured to enable description of a web service, wherein the at least one file includes:
      one or more descriptions, within a first node and using a standardized format, of common web service properties associated with the web service, the common web service properties being properties shared among multiple different web services, wherein the common web service properties include:
         a property associated with a homepage uniform resource locator (URL); and
         a property associated with a visually-renderable display that is expressed via a display tag, the property associated with the visually-renderable display comprising an icon property containing a link to an icon; and
      one or more descriptions, within a second node and using the standardized format, of specific functionality associated with the web service, the specific functionality including:
         at least one activity category configured to describe a type of service associated with the web service;
         at least one action definition associated with the web service, each action definition configured to describe an action a user can take associated with the web service, including a preview action configured to cause display of a preview of an associated function, the associated function configured to execute responsive to the user selecting the display of the preview; and at least one input parameter to the web service;

wherein the one or more descriptions within a first node and the one or more descriptions within a second node are available to one or more client-side applications.

16. The one or more computer readable storage media hardware of claim 15, the standardized format comprising Extensible Markup Language (XML).

17. The one or more computer readable storage media hardware of claim 15, wherein the at least one file further includes one or more descriptions of at least one extension to the web service, using the standardized format.

18. The one or more computer readable storage media hardware of claim 17, wherein the one or more descriptions of the at least one extension to the web service further comprises a namespace associated with the at least one extension to the web service.

19. The one or more computer readable storage media hardware of claim 17, wherein the one or more description of the at least one extension to the web service further comprises one or more parameters associated with the at least one extension to the web service.

* * * * *